(No Model.)
J. CRAMPTON.
RUBBER HOSE.
No. 377,801. Patented Feb. 14, 1888.
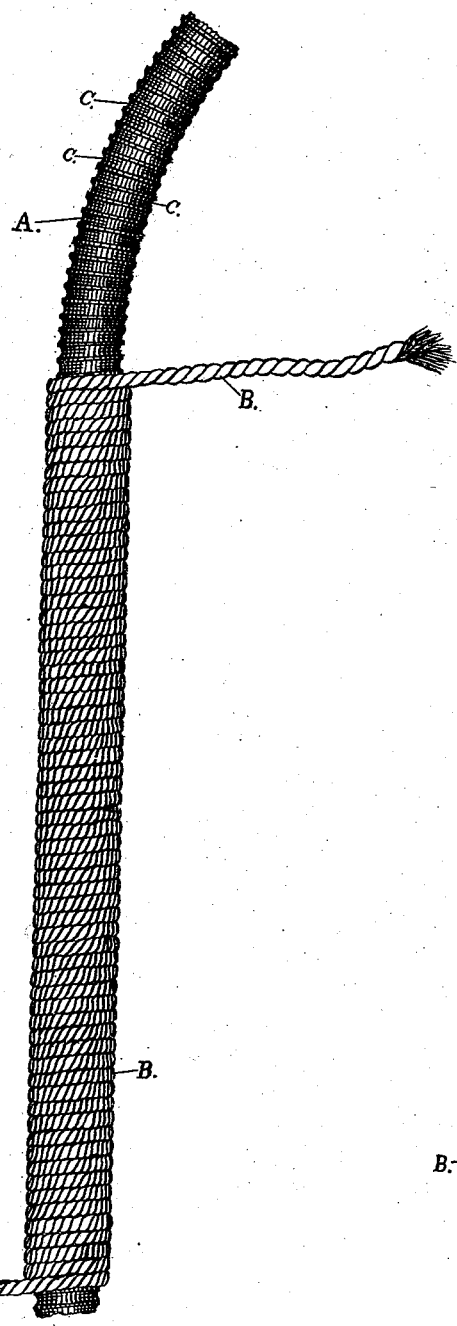
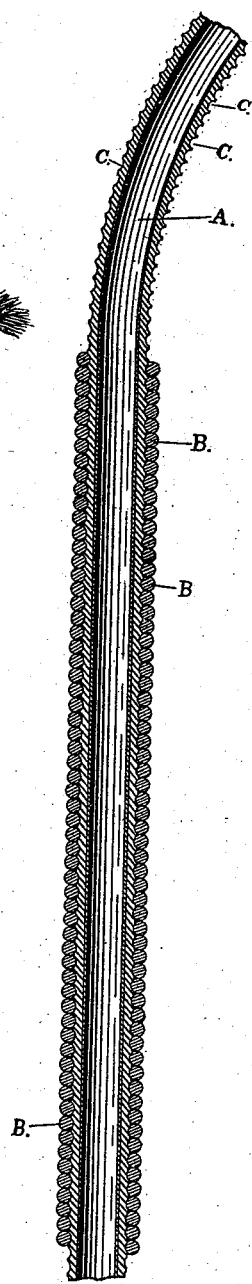
ATTEST,
John H. Redstone,
E. S. Belcher.
INVENTOR,
James Crampton.

United States Patent Office.

JAMES CRAMPTON, OF SAN FRANCISCO, CALIFORNIA.

RUBBER HOSE.

SPECIFICATION forming part of Letters Patent No. 377,801, dated February 14, 1888.

Application filed February 19, 1887. Serial No. 228,159. (No model.)

*To all whom it may concern:*

Be it known that I, JAMES CRAMPTON, a citizen of the United States, residing in the city and county of San Francisco, and State of California, have invented a new and useful Improvement in Garden and other Hose, of which the following is a specification.

My invention relates to garden, irrigating, and other hose; and it consists, as a new article of manufacture, of a rubber hose having its entire outer surface provided with deep spiral grooves separated by spiral ribs and wound between said spiral ribs with rope, which covers the entire surface of the rubber hose, as hereinafter set forth.

Figure 1 is a perspective view of a broken part of a hose with my improvement attached. Fig. 2 is a longitudinal section of the same cut vertically through the center.

Before describing the details of construction, I desire to say that I am well aware that it is not new to cover the entire outer surface of a hose with a spirally-wound wire or cord.

A desideratum in this class of hose has been to provide means for securely seating the cord or wire thus wrapped, so as to guard against unwrapping and displacement thereof. I have found by experience that when the hose has been formed with a plain superficial surface it is exceedingly difficult to wrap it so that the cord will, after use, retain its position. This is especially the case with rubber hose, which is so elastic and liable to give to the inward pressure, throwing off the end coils, which are readily followed by the others. By my construction it will be seen that the hose is first prepared to receive a rope by forming close, spiral, and deep grooves thereon. It will also be seen that by this construction, no matter how sharp a bend may be made in the hose, the rope will not be thrown out of the deep grooves, and that while the entire outer surface is coated with this closely-wound rope, yet between each whirl on the hose will always be formed a rib to guard against their displacement.

A represents the hose; B, the stay and binding cord.

The hose is constructed of rubber or other suitable material, such as is commonly employed in the manufacture of the same.

The object of the wrapping with cord or small rope, as the case may be, is to secure a perfectly-protecting arch for every part of the outer surface of the hose, whereby it is prevented from all liability to kink, with the further advantage of securing a far greater strength, thereby avoiding the liability to burst, to which the ordinary garden-hose is so liable. In order to effect this construction perfectly, I have formed the hose A with the spiral groove C, arranged to receive the cord in the same position as the cord assumes in being wound around, and rendering the wrapping uniform, and avoiding the liability of wrapping closer at one part than another; also avoiding the liability to crowd along the hose by the action of swelling and shrinking when wet and dried.

The object of my invention is simply to secure the practical wrapping of the hose with a cord of sufficient size and strength to secure the required protection against liability to kink or burst.

Having thus described my invention, what I claim, and desire to secure by Letters Patent, is—

As an improved article of manufacture, a rubber hose having its entire outer surface provided with deep spiral grooves separated by spiral ribs and wound between said spiral ribs with rope, which covers the entire surface of the rubber hose, substantially as specified.

JAMES CRAMPTON.

Witnesses:
JOHN H. REDSTONE,
L. E. REDSTONE.